United States Patent [19]

Mita et al.

[11] Patent Number: 5,151,924
[45] Date of Patent: Sep. 29, 1992

[54] AUTOMATIC EQUALIZATION METHOD AND APPARATUS

[75] Inventors: Seiichi Mita, Kanagawa; Morishi Izumita, Inagi; Hiroshi Ide, Kodaira; Nobukazu Doi, Hachioji; Yoshinori Okada, Yokohama; Yasuo Inagaki, Katsuta, all of Japan

[73] Assignee: Hitachi, Ltd., Japan

[21] Appl. No.: 454,406

[22] Filed: Dec. 21, 1989

[30] Foreign Application Priority Data

Dec. 23, 1988 [JP] Japan ................... 63-323294

[51] Int. Cl.$^5$ ............................. H03H 7/30
[52] U.S. Cl. ........................ 375/12; 333/18; 364/724.2
[58] Field of Search ............ 375/11, 12, 14, 15; 333/18, 28 R; 364/724.2

[56] References Cited

U.S. PATENT DOCUMENTS

| | | | |
|---|---|---|---|
| 3,414,845 | 12/1968 | Lucky | 333/18 |
| 3,665,394 | 5/1972 | Lender et al. | 375/14 |
| 3,715,670 | 2/1973 | Hirsch et al. | 333/18 |
| 3,736,414 | 5/1973 | McAuliffe | 375/14 |
| 3,775,685 | 11/1973 | Eggimann et al. | 375/12 |
| 3,781,720 | 12/1973 | Mueller | 333/18 |
| 3,820,042 | 6/1974 | Mueller | 375/14 |
| 4,298,983 | 11/1981 | Kawai et al. | 375/12 |
| 4,453,256 | 6/1984 | Ryu | 375/15 |

Primary Examiner—Stephen Chin

[57] ABSTRACT

An automatic equalization apparatus useful for supplying an output signal of a transversal filter simultaneously to two juxtaposed comparators, one of the two comparators performing signal identification, the other of the two comparators detecting an equalization error with the reference level changed, and extracting data from resultant two kinds of data trains by taking at least $(N-1)/2+1$ bits as the unit, N being the number of taps of the transversal filter, performing correlation computation, and setting tap coefficients of the transversal filter on the basis of the resultant accumulated value.

6 Claims, 3 Drawing Sheets

AUTOMATIC EQUALIZATION METHOD AND APPARATUS

BACKGROUND OF THE INVENTION

The present invention relates to an automatic equalization apparatus for a recording system or a transmission system, and in particular to an automatic equalization method, and apparatus attaining high-speed, high-precision operation with simple configuration.

In order to prevent occurrence of intersymbol interference in a digital information train having a period T, its impulse response h(t) must, in general, satisfy the so-called Nyquist condition with the Nyquist frequency equivalent to ½T. That is to say, the following relations must be satisfied at time nT.

$$h(nT) = 0 \quad |n| \geq 1 \tag{1}$$
$$h(nT) = 0 \quad n = 0$$

An automatic equalizer automatically sets tap coefficients of a transversal filter so that the impulse response reproduced from a VTR, a disk or the like may satisfy equation (1). A so-called zero forcing algorithm is included in basic algorithms of automatic equalization as described in, for example, U.S. Pat. No. 3,414,845 issued on Dec. 3, 1968 to R. W. Lucky. An example of an apparatus based upon this scheme is shown in FIG. 2. By referring to FIG. 2, operation of this algorithm will now be described briefly and at the same time problems of this scheme will be made clear.

As shown in FIG. 2, a transversal filter typically comprises delay lines 1 and 2, gain adjusting circuits 3, 4 and 5, and an adder 6. It is now assumed that each gain adjusting circuit has a coefficient Cj. Assuming now that the impulse response from the information source to the equalizer output is h(t), the sum D of absolute values of intersymbol interference obtained after equalization is given by the following equation.

$$D = \sum_{\substack{k=-\infty \\ \neq 0}}^{\infty} |h(kT)| \tag{2}$$

In the zero forcing algorithm, the gain of the transversal filter is so controlled that the value of D may be minimized. Assuming now that the pulse train supplied from the information source has a value $a_k$ (where $a_k$ is a binary valued signal comprising "1" or "0") at time kT, the output of the adder 6 at time kT is given by the following equation.

$$y_k = \sum_{l=-\infty}^{\infty} a_k h(kT - lT) \tag{3}$$

A signal $e_k$ corresponding to an equalization error is given by the following equation.

$$e_k = y_k - a_k' \tag{4}$$

Character $a_k'$ represents a value obtained by identifying and reproducing $y_k$ in a comparator 7 of FIG. 2 and coincides with $a_k$ in the absence of a code error. Character $e_k$ denotes an output of a comparator 8. By using the above described $a_k'$ and $e_k$, evaluation function $H_j$ of equalization error is given by $$H_j = \sum_{k=0}^{m} sgn(a'_{k-j}) sgn(e_k) \tag{5}$$

where m is a value depending upon the signal-to-noise ratio (SN ratio) and is typically in a range $10^3 < m < 10^4$.

The value of $H_j$ is derived by using a computer 10 shown in FIG. 2. By increasing the coefficient $C_j$ of the gain adjusting circuit by a minimum amount $\Delta$ when $H_j$ is positive and by decreasing the coefficient $C_j$ by the minimum amount $\Delta$ when $H_j$ is negative, the intersymbol interference D represented by equation (2) is reduced. If input data comprises a train in which "1" or "0" appears randomly, automatic equalization is attained by the zero forcing algorithm heretofore described.

The above described equalizer basically has two problems described below.

(1) In the configuration shown in FIG. 2, the main line signal which becomes the reference of $H_j$ passes through the gain adjusting circuit 4. Therefore, the gain adjusting circuit must be high in precision. Especially in a reproduced signal of a digital VTR, an amplitude variation having a high frequency component caused by defective contact between the tape and the head is incurred. For such a signal, gain adjusting circuits which are rapid in response speed become necessary. Further, since high-speed pulses of 100 Mbps or more are recorded onto/reproduced from the digital VTR, gain adjusting circuits having wide bandwidth become necessary. It is extremely difficult to realize gain adjusting circuits satisfying all of the conditions heretofore described.

(2) In addition, calculation of equation (5) must be executed at a speed of 100 Mbps in the above described equalizer configuration. Calculation of equation (5) is performed with respect to a series of m pulses depending upon the signal-to-noise ratio. Since dropouts often occur in the recording/reproducing system, however, a serious error is caused in the calculation result if pulses are missed consecutively.

SUMMARY OF THE INVENTION

An object of the present invention is to provide a high-speed, high-precision automatic equalization method, and apparatus.

According to one aspect of the present invention, an output signal of a transversal filter is simultaneously supplied to two juxtaposed comparators, signal identification in one of the two comparators is performed, an equalization error is detected in the other of the two comparators with the reference level thereof changed, data from resultant two kinds of data trains are extracted by taking at least $(N-1)/2+1$ bits as the unit, N being the number of taps of the transversal filter, correlation computation is performed therewith, and tap coefficients of the transversal filter are set on the basis of the resultant accumulated value. By such configuration, only the equalization error generated in the recording/reproducing system can be detected with extremely high precision without exerting any influence of the gain adjusting circuit upon the main line signal, thereby automatic equalization being made possible.

DESCRIPTION OF THE PREFERRED EMBODIMENTS

Figure 1:
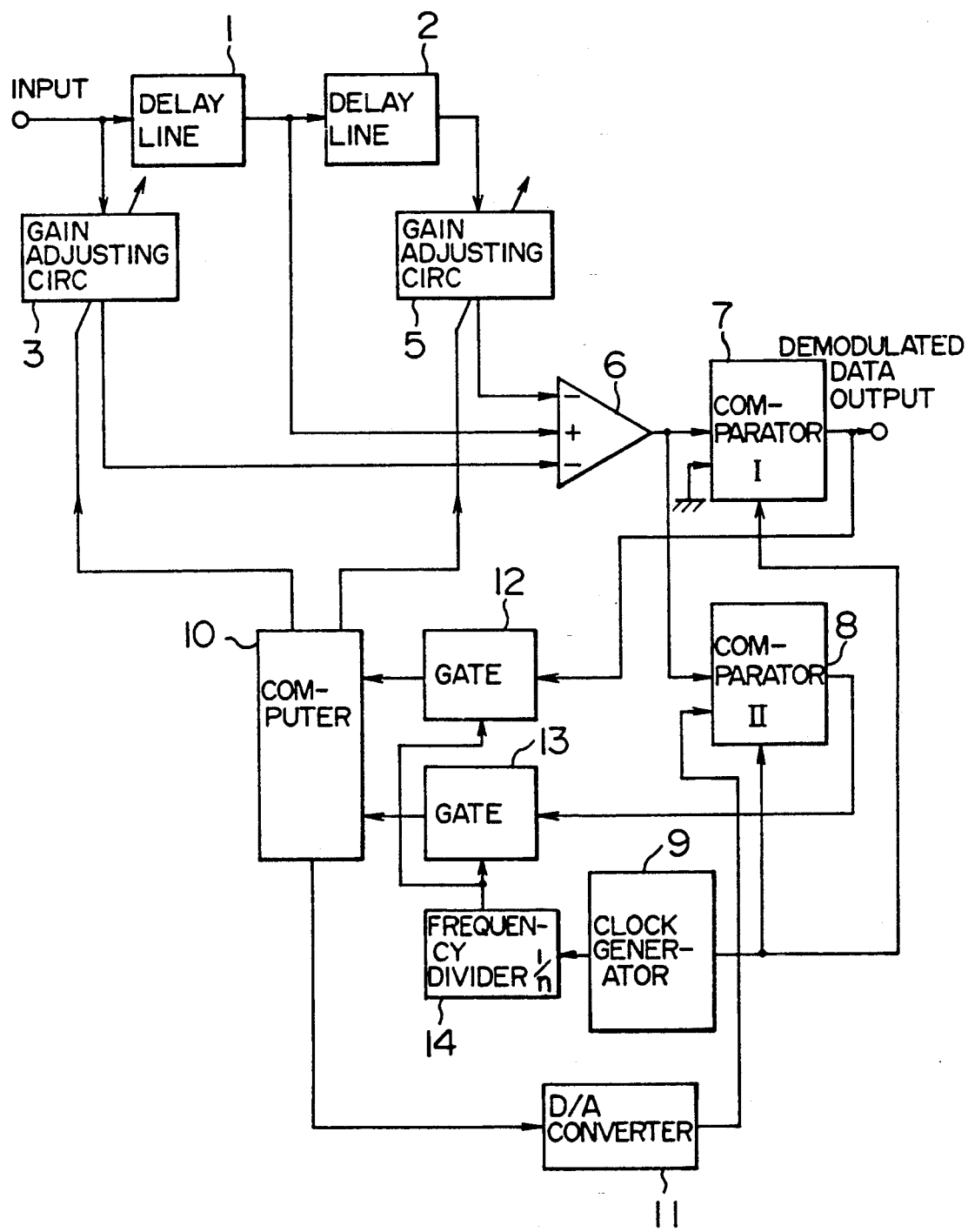
FIG. 1 is a configuration diagram of an embodiment of an automatic equalization apparatus according to the present invention.
Figure 2:
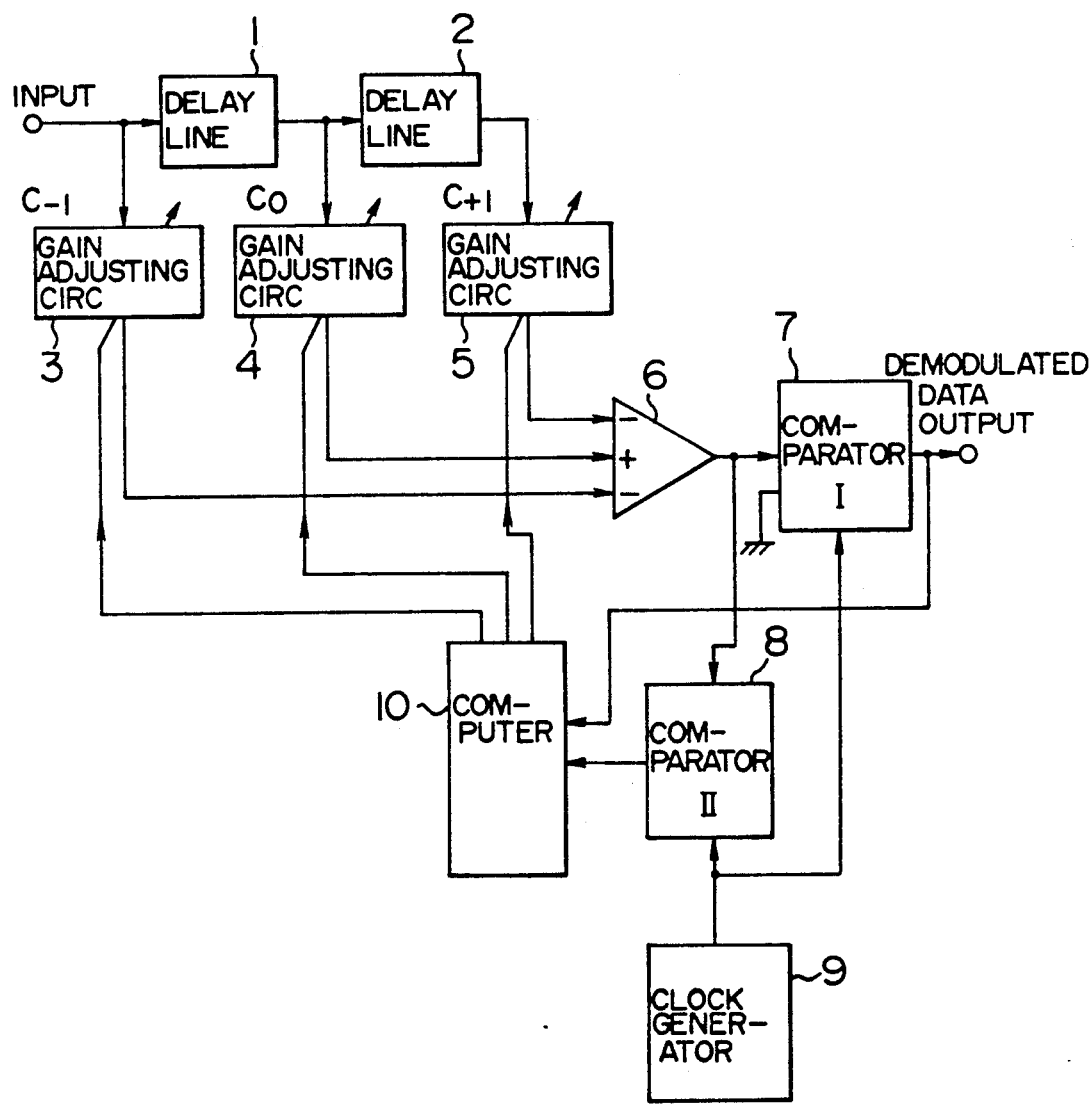
FIG. 2 is a configuration diagram of an automatic equalization apparatus of the prior art.
Figure 3A:
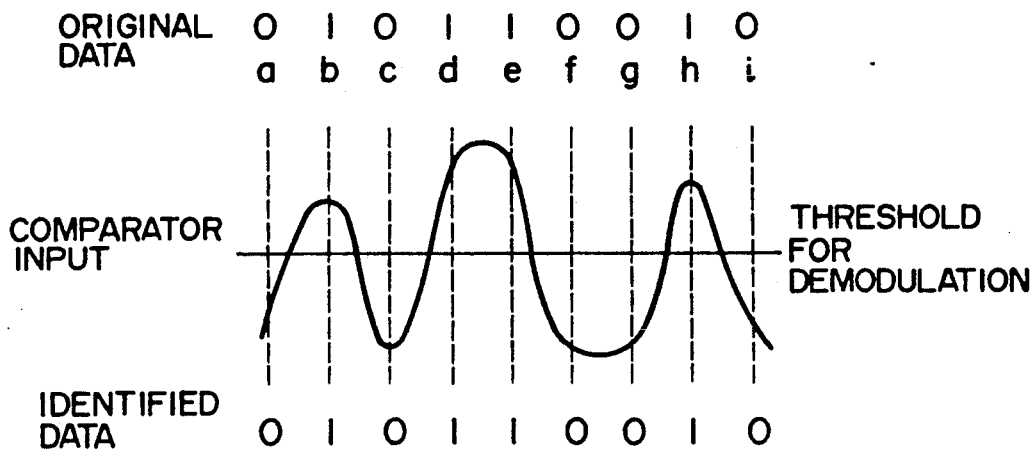
FIGS. 3A and 3B are operation waveform diagrams of the automatic equalization apparatus according to the present invention.
Figure 3B:
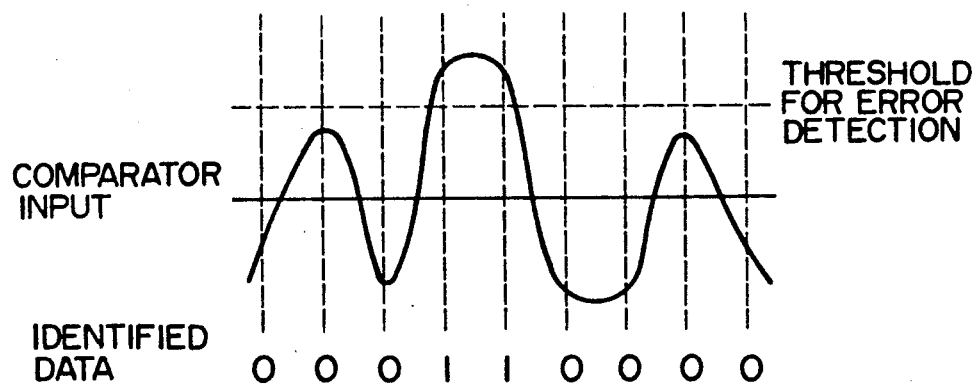

FIG. 1 shows an embodiment of an automatic equalization apparatus according to the present invention. In accordance with the present invention, the gain adjusting circuit 4 of the prior art is not used, and the main line signal outputted by the delay line 1 is directly supplied to the adder 6. Thereafter, the output of the adder 6 is supplied simultaneously to two comparators, where its amplitude undergoes binary decision. As represented by "threshold for demodulation" of FIG. 3A, the comparator 7 has a threshold set at an intermediate level between amplitudes respectively corresponding to "1" and "0". In the absence of an error, therefore, the output of the comparator 7 corresponds to the original data. On the other hand, the comparator 8 is provided, as its reference level, with a threshold higher than that of the comparator 7 or a threshold lower than that of the comparator 7 to convert the output of the adder 6 into a binary value. FIG. 3B shows an example of a higher threshold. The equalization error $e_k$ represented by equation (4) can be obtained at the output of the comparator 8 by making $+1$ correspond to "1" of the signal $a_k'$ as the higher threshold and making $-1$ correspond to the amplitude of "0" as the lower threshold. For this purpose, the value of $H_j$ expressed by equation (5) is rewritten as represented by the following equation.

$$H_j = \sum_{k=0}^{m} sgn(a'_{k-j})sgn(e_k) \qquad (6)$$

$$= \sum_{k=0}^{m} sgn(a'_{k-j})sgn(e_k)a'_k +$$

$$\sum_{k=0}^{m} sgn(a'_{k-j})sgn(e_k)(1 - a'_k)$$

where $$Sgn(\alpha) = \begin{cases} 1 & \alpha \geq 0 \\ -1 & \alpha < 0 \end{cases}$$

The former half (the second line) of equation (6) represents an equalization error obtained when the signal $a_k'$ is "1", whereas the latter half (the third line) of equation (6) represents an equalization error obtained when the signal $a_k'$ is "0". Since a waveform obtained when $a_k'$ is "1" and that obtained when $a_k'$ is "0" are typically symmetrical, the equalization error $H_j$ can be calculated by using only one of the former half and the latter half. In the recording/reproducing system, however, the waveform of "1" often differs from that of "0" because of occurrence of nonlinear distortion. In this case, it is possible to derive values of $H_j$ for both the former half and the latter half and use the average of the results. $H_j$ is calculated in accordance with equation (5) by using the computer 10. In response to that result, the output value of a D/A converter 11 is increased or decreased. The threshold of the comparator 8 is thus controlled to become a required amplitude value of $a_k'$. By thus changing the threshold of the comparator 8, the function of the gain adjusting circuit 4 can be equivalently realized. At the present time, a D/A converter having 10 or more bits as the number of quantization bits and capable of operating at a frequency of 10 MHz or higher is already available on the market. By using such a D/A converter, only the equalization error generated in the recording/reproducing system can be detected with extremely high precision without exerting any influence of the gain adjusting circuit upon the main line signal, automatic equalization being made possible. As a result, the above described first problem is eliminated.

A method for eliminating the second problem will now be described by referring to the embodiment. The number of taps of a transversal filter is practically limited. Assuming now that the number of taps is 3 as an example, a concrete example will be hereafter described. It is now assumed that the equalization error of each tap coefficient is detected by using only the former half shown in the second line of equation (6). Evaluation values $H_j$ for controlling respective tap coefficients are given by the following equation.

$$H_1 = \sum_{k=0}^{m} sgn(a'_{nk-1})sgn(e_{nk})a'_{nk} \qquad (7)$$

$$H_{-1} = \sum_{k=0}^{m} sgn(a'_{nk+1})sgn(e_{nk})a'_{nk}$$

$$H_0 = \sum_{k=0}^{m} sgn(a'_{nk})sgn(e_{nk})a'_{nk}$$

Figure 4:
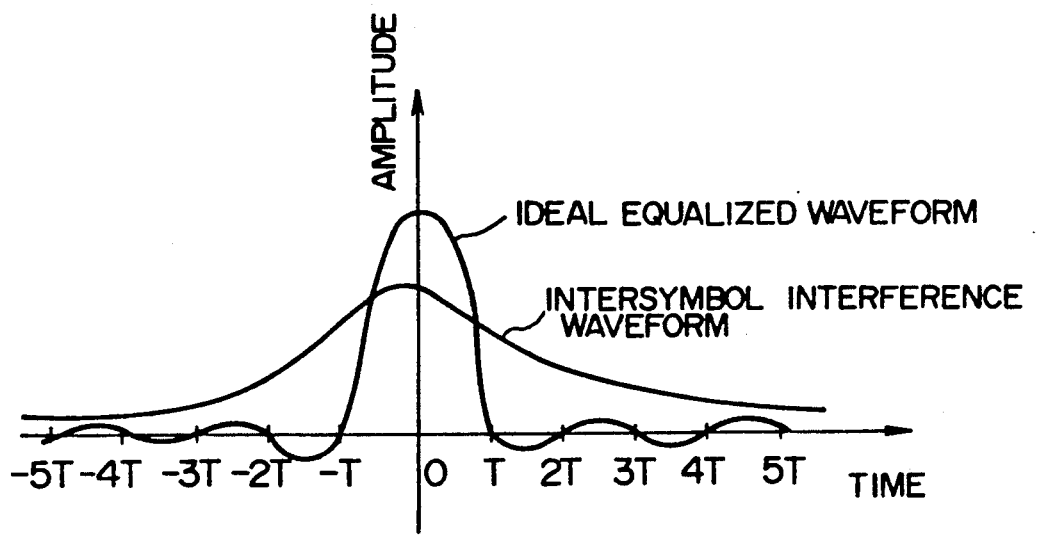
FIG. 4 is an auxiliary diagram showing operation of the automatic equalization apparatus according to the present invention.

Letting $n = 1$, this equation coincides with the former half of equation (6). However, there is not the necessity that $n = 1$. Considering now $H_1$ as an example, the value of $H_1$ can be derived if there is a train of adjacent $a'_k$ and $e_k$. This fact similarly holds true for $H_{-1}$ and $H_0$ as well. To facilitate understanding, $H_1$ in equation (7) will now be concretely calculated in accordance with FIGS. 3A and 3B. The waveform shown in FIGS. 3A and 3B is obtained when intersymbol interference as shown in FIG. 4 appears in an isolated waveform. For brevity of description, it is now assumed that values such as (a, b), (b, c), (c, d),—(h, i) as shown in FIGS. 3A and 3B are obtained as a result of sampling at intervals of n bits. In this case, identified data of FIG. 3A becomes "1" at time b, d, e and h, and $e_k$ is obtained from identified data of FIG. 3B. Therefore, $H_1$ is represented by the following equation.

$$H_1 = (-1)(-1) + (-1)(1) + (1)(1) + (-1)(-1) \qquad (8)$$
$$= 2$$

That is to say, the tap coefficient $C_1$ of the equalizer must be increased by $\Delta$ so as to decrease the intersymbol interference. This holds true for other equations as well. Assuming now that the number of taps of the transversal filter is N, it is evident from this example that evaluated values required for respective tap coefficients are obtained by extracting adjacent data comprising at least $(N-1)/2+1$ bits respectively from trains of $a'_k$ and $e_k$ and performing correlation computation. Therefore, influence of dropout in the recording/reproducing system can be avoided by choosing n so as to satisfy the relation $n \gg 1$. The operation heretofore described may be specifically carried out by frequency-dividing the output of a clock generator 9 by n at a frequency divider 14, supplying the resultant clock signal from the frequency divider 14 to gate circuits 12 and 13, extracting a data of a predetermined number of successive bits (a predetermined length of data) at intervals of n bits, and deriving respective evaluation values in the computer 10 by using the data thus extracted. The automatic equalization apparatus according to the present invention heretofore described operates if the data train to be handled is random.

As heretofore described, the present invention makes it possible to obtain a high-speed, high-precision automatic equalization method, and apparatus having simple configuration which can be applied to a recording system or a transmission system.

We claim:

1. An automatic equalization apparatus, comprising:
   first and second delay lines in cascade connection for delaying an input signal;
   a first gain adjusting circuit connected to an input side of said first delay line;
   a second gain adjusting circuit connected to an output side of said second delay line;
   an adder for adding an output signal of said first delay line and output signals of said first and second gain adjusting circuits;
   a first comparator for identifying an output signal of said adder;
   a second comparator for detecting an equalization error of the output signal of said adder;
   means for controlling said first and second gain adjusting circuits on the basis of the result of identification in said first comparator and the equalization error detected in said second comparator; and,
   conversion means for converting a digital signal to an analog signal, wherein the conversion means is interposed between the second comparator and the controlling means.

2. An automatic equalization apparatus using a transversal filter, comprising:
   $(N-1)$ delay lines in cascade connection for delaying an input signal, said N being the number of taps of a transversal filter;
   $(N-1)$ gain adjusting circuits, each connected to the corresponding tap excepting the central tap of the transversal filter;
   an adder for adding an output signal of the central tap and output signals of said gain adjusting circuits;
   a first comparator for identifying an output signal of said adder;
   a second comparator for detecting an equalization error of the output signal of said adder;
   means for controlling said gain adjusting circuits on the basis of the result of identification in said first comparator and the equalization error detected in said second comparator; and,
   a first gate between the first comparator and the controlling means and a second gate between the first comparator and the controlling means, said first and second gates extracting data comprising at least $(N-1)/2+1$ bits as a unit at intervals of n bits (where $n > 1$).

3. An automatic equalization apparatus comprising:
   first and second delay lines in cascade connection for delaying an input signal;
   a first gain adjusting circuit connected to the input side of the first delay line;
   a second gain adjusting circuit connected to the output side of the second delay line;
   an adder for adding an output signal of said first delay line and output signals of said first and second gain adjusting circuits;
   a first comparator for identifying an output signal of said adder;
   a second comparator for detecting an equalization error of the output signal of said adder;
   means for controlling said first and second gain adjusting circuits on the basis of the result of identification in said first comparator and the equalization error detected in said second comparator;
   a first gate between the first comparator and the controlling means; and,
   a second gate between the second comparator and the controlling means, the first and second gates extracting data comprising at least 2 bits as a unit at intervals of n bits (where $n > 1$).

4. An automatic equalization apparatus as claimed in claim 3, further comprising a clock generator interposed between the second comparator and a frequency divider, said clock generator sending a signal to the frequency divider wherein the frequency divider sends the resultant clock signal to the first and second gates.

5. An automatic equalization method in a system having input circuitry including a central tap and a plurality of gain adjusting circuits operatively connected to other taps of the input circuitry, an adder, two comparators, and control circuitry, including a computer, that controls the gain adjusting circuits, the method comprising steps of:
   delivering input signals to the adder from the gain adjusting circuits and the central tap;
   adding the input signals by the adder to obtain an output signal;
   supplying the output signal to both a first comparator and a second comparator;
   identifying the output signal by the first comparator;
   detecting an equalization error, based on the output signal, by the second comparator; and,
   controlling the plurality of gain adjusting circuits by the computer based on the identified output signal and the equalization error by selecting signals from the first and second comparators at predetermined intervals based on a number of the other taps whereby the equalization error is detected without affecting the input signal from the central tap.

6. An automatic equalization method in a system having input circuitry including a central tap and a plurality of gain adjusting circuits operatively connected to other taps of the input circuitry, an adder, two comparators, and control circuitry, including a computer, that controls the gain adjusting circuits, the method comprising steps of:
   delivering input signals to the adder from the gain adjusting circuits and the central tap;
   adding the input signals by the adder to obtain an output signal;
   supplying the output signal to both a first comparator and a second comparator;

identifying the output signal by the first comparator;
detecting an equalization error, based on the output signal, by the second comparator; and,
controlling the plurality of gain adjusting circuits by the computer based on the identified output signal and the equalization error by adjusting a threshold of the second comparator by using a digital/analog converter whereby the equalization error is detected without affecting the input signal from the central tap.

* * * * *